US012629787B2

(12) United States Patent
Siebenborn et al.

(10) Patent No.: US 12,629,787 B2
(45) Date of Patent: May 19, 2026

(54) MODULAR APPLICATION APPARATUS AND MODULAR KIT FOR CONSTRUCTING AN APPLICATION APPARATUS

(71) Applicants: thyssenkrupp Automotive Body Solutions GmbH, Heilbronn (DE); thyssenkrupp AG, Essen (DE)

(72) Inventors: Christoph Siebenborn, Losheim am See (DE); Tim Kaub, Hermeskeil (DE); Bernd Paulus, Nonnweiler (DE)

(73) Assignees: thyssenkrupp Automotive Body Solutions GmbH, Heilbronn (DE); thyssenkrupp AG, Essen (DE)

( * ) Notice: Subject to any disclaimer, the term of this patent is extended or adjusted under 35 U.S.C. 154(b) by 365 days.

(21) Appl. No.: 18/213,563

(22) Filed: Jun. 23, 2023

(65) Prior Publication Data

US 2023/0415281 A1      Dec. 28, 2023

(30) Foreign Application Priority Data

Jun. 24, 2022    (DE) ..................... 10 2022 206 369.4

(51) Int. Cl.
B23P 19/04        (2006.01)
B60J 10/00        (2016.01)
(52) U.S. Cl.
CPC ............. B23P 19/047 (2013.01); B60J 10/45 (2016.02)
(58) Field of Classification Search
CPC .. B23P 19/047; B60J 10/45; B25J 9/08; B25J 9/1661; B25J 9/0009; B25J 15/0019; B25J 15/0066; B25J 15/0061; B25J 15/0052; B25J 19/023; B25J 19/021
See application file for complete search history.

(56) References Cited

U.S. PATENT DOCUMENTS

| | | | | |
|---|---|---|---|---|
| 4,620,354 | A | * | 11/1986 | Hess ........................ B60J 10/45 29/451 |
| 4,760,636 | A | * | 8/1988 | St. Angelo, Jr. ...... B23P 19/047 29/450 |
| 5,069,739 | A | | 12/1991 | Kautt |
| 5,129,134 | A | * | 7/1992 | St. Angelo, Jr. ...... B23P 19/047 901/50 |
| 5,201,106 | A | * | 4/1993 | Moore .................. B23P 19/047 414/744.1 |
| 5,237,730 | A | * | 8/1993 | Goedderz ................ B60J 10/45 29/243.58 |
| 10,046,403 | B2 | * | 8/2018 | George ................ B25J 11/0055 |
| 10,710,438 | B2 | * | 7/2020 | Thommes ................ B60J 10/45 |

(Continued)

FOREIGN PATENT DOCUMENTS

| | | | | |
|---|---|---|---|---|
| DE | 3541865 | A1 | * | 6/1987 ............ B62D 65/14 |
| DE | 602004000743 | T2 | | 5/2007 |

(Continued)

*Primary Examiner* — Jason L Vaughan
(74) *Attorney, Agent, or Firm* — thyssenkrupp North America, LLC

(57) ABSTRACT

The present disclosure relates to an application apparatus for applying a sealing profile to a bodywork part, comprising a roller head, which is designed to apply the sealing profile to a receiving surface of the bodywork part, and at least one further functional unit for performing a further station step, wherein the at least one further functional unit is respectively designed as a functional module from a set of functional modules.

20 Claims, 11 Drawing Sheets

(56) References Cited

U.S. PATENT DOCUMENTS

| | | | | |
|---|---|---|---|---|
| 11,413,761 B2 * | 8/2022 | Simkins | ................... | B25J 9/161 |
| 12,285,867 B2 * | 4/2025 | Nienaber | ............. | B25J 11/0065 |
| 2005/0193544 A1 * | 9/2005 | Supina | .................... | B60J 10/45 |
| | | | | 49/451 |
| 2010/0024976 A1 * | 2/2010 | Grohmann | ............... | B60J 10/45 |
| | | | | 156/367 |
| 2013/0037212 A1 * | 2/2013 | Maischberger | ....... | B23P 19/047 |
| | | | | 156/499 |

FOREIGN PATENT DOCUMENTS

| | | | |
|---|---|---|---|
| DE | 10 2010 011 976 A1 | 9/2011 |
| DE | 102011050750 A1 | 12/2012 |
| DE | 10 2016 213 905 A1 | 2/2018 |
| DE | 10 2017 221 018 B3 | 1/2019 |
| DE | 10 2018 202 850 A1 | 8/2019 |
| DE | 102020203646 A1 | 9/2021 |
| DE | 10 2020 118 940 A1 | 1/2022 |
| WO | 2004/108459 A1 | 12/2004 |

* cited by examiner

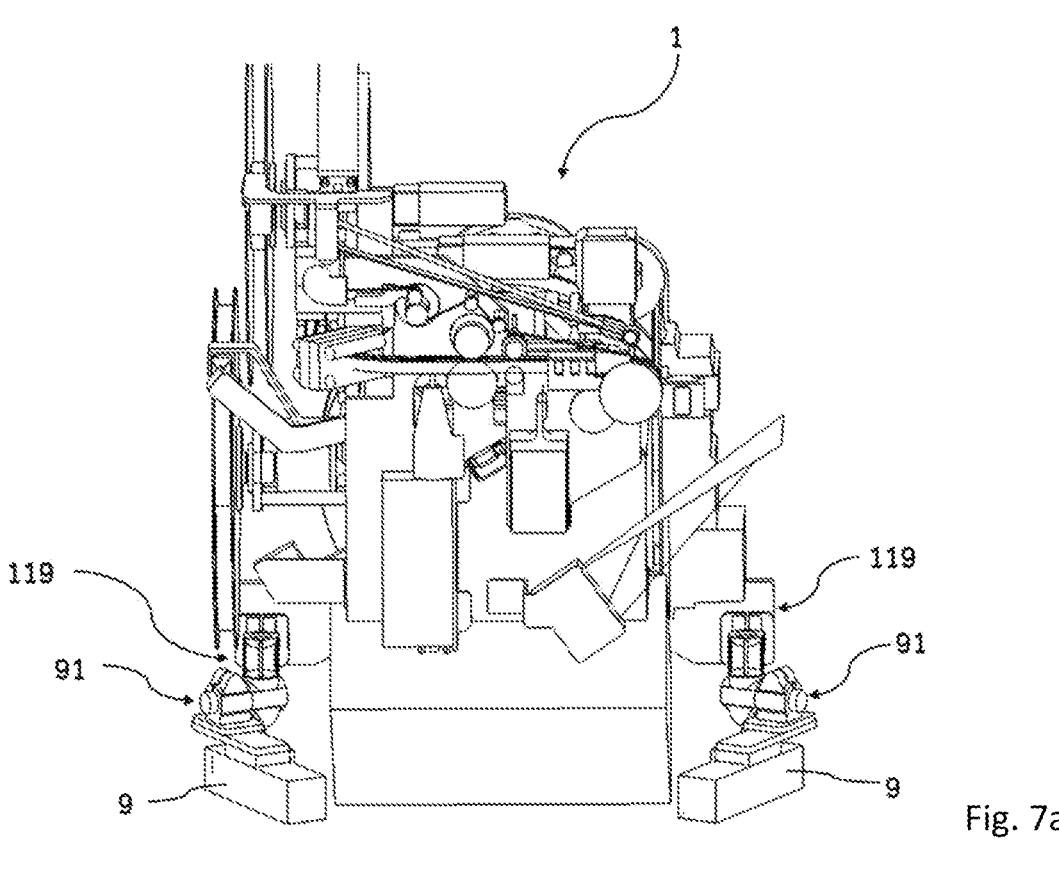
Fig. 7a
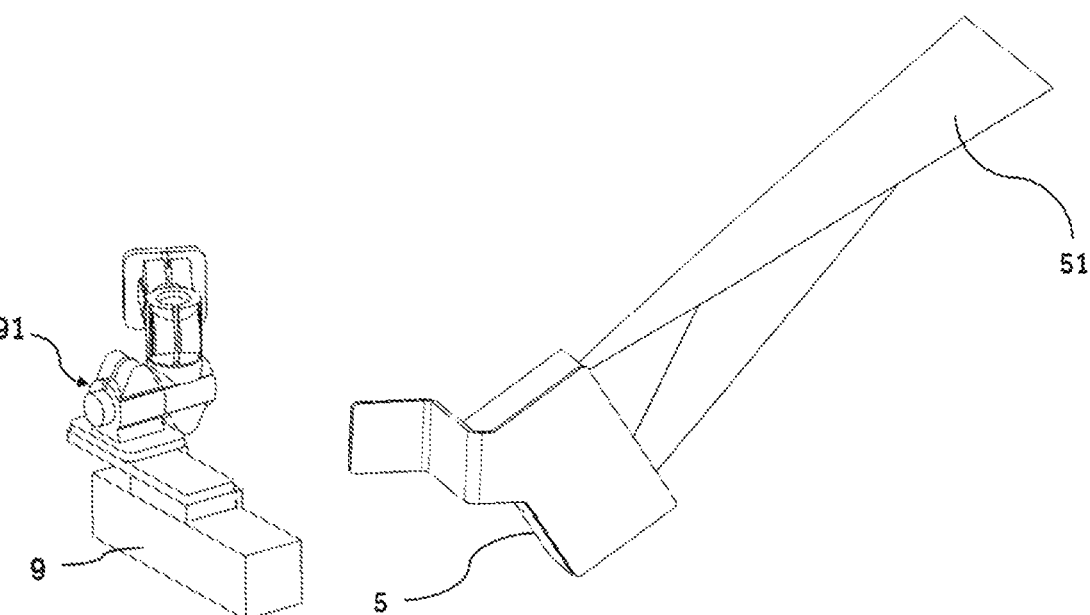
Fig. 7b
Fig. 8b

MODULAR APPLICATION APPARATUS AND MODULAR KIT FOR CONSTRUCTING AN APPLICATION APPARATUS

CROSS REFERENCE TO RELATED APPLICATION

This application is a U.S. Non-Provisional that claims priority to German Patent Application No. DE 10 2022 206 369.4, filed Jun. 24, 2022, the entire content of which is incorporated herein by reference.

FIELD

The disclosure generally relates to an application apparatus for applying a sealing profile to a bodywork part, and more specifically to a modular kit for constructing an application apparatus.

BACKGROUND

Sealing profiles are applied, for example, to a bodywork part serving to close a bodywork opening, in particular in order to establish a sealing connection between a bodywork opening and a cover inserted into the opening. Such a cover can be, for example, a door, a boot lid or a sunroof element.

DE 10 2017 221 018 B3 discloses an application apparatus for applying a sealing profile to a bodywork part, the application apparatus comprising a cleaning device. A surface region of the bodywork part here is defined as a joining location for applying the sealing profile, this surface region also being referred to as a receiving surface. This surface region is then cleaned mechanically prior to application of the sealing profile, in order to bind dust and to remove and collect residues of lubricant from the bodywork part. An adhesively bonded sealing profile grips more reliably on the surface region when the latter has been cleaned than when cleaning has been dispensed with. Such an application apparatus forms a production station.

It is also known that the sealing profile can have holes through which for example condensation which has collected beneath the sealing profile can exit. Such holes are made in the sealing profile in a separate production station, which is usually spatially separate from the application apparatus, so that the sealing profile with the holes made in it can then be used in the application apparatus.

Thus, a need exists to provide an improved application apparatus which makes it possible in particular for method steps associated with the sealing profile and/or the application of the sealing profile to be carried out in a smaller amount of time and advantageously with a smaller amount of space being required. It is advantageously the intention, in addition, for the application apparatus to be able to meet different requirements in a cost-effective manner.

BRIEF DESCRIPTION OF THE FIGURES

Further advantageous details, features and specifics of the disclosure will be explained in more detail in combination with the embodiments illustrated in the figures, in which:

FIGS. 7a and 7b show perspective views of an embodiment of a functional module in the form of a sensor unit for checking a position of a bodywork part in space.

FIGS. 8a and 8b show perspective views of an embodiment of a functional module in the form of a sensor unit for checking the position of the sealing profile applied to a bodywork part.

FIGS. 9a and 9b show perspective views of an embodiment of a functional module in the form of a sensor unit for checking the contact-pressure force.

DETAILED DESCRIPTION

Figures 1, 2:
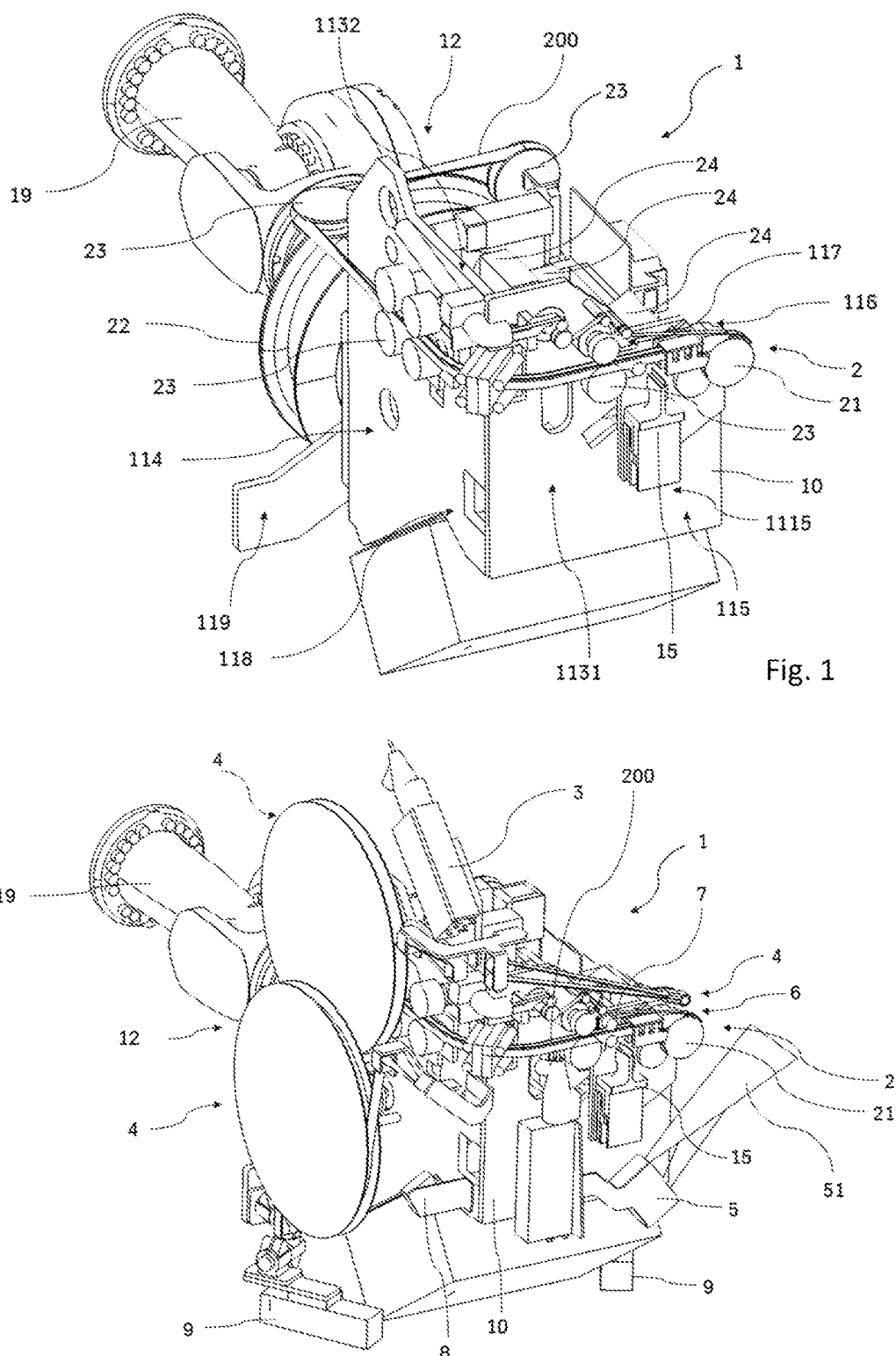
FIG. 1 shows a perspective view of one embodiment of an application apparatus according to the disclosure.
FIG. 2 shows a perspective view of another embodiment of an application apparatus according to the disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The proposed solution provides an application apparatus for applying a sealing profile to a bodywork part, in particular to a bodywork part serving to close a bodywork opening. The application apparatus comprises a roller head, which is designed to apply the sealing profile to a receiving surface of the bodywork part, this forming a first station step, and at least one further functional unit, which is respectively designed to perform further station step associated with the sealing profile and/or the application of the sealing profile. The at least one further functional unit here is respectively designed as a functional module of a set of functional modules, wherein the set can also comprise, in particular, precisely one functional unit. According to the disclosure, provision is also made for the application apparatus to have a base body, wherein the base body has the roller head and a plurality of predetermined arrangement positions. A specific arrangement position from the plurality of predetermined arrangement positions is assigned a respective functional module from the set of functional modules for arranging on the base body, wherein each functional module of the application apparatus is arranged at the arrangement position assigned to the respective functional module. To this extent, the base body advantageously comprises always the same number of arrangement positions, in particular irrespective of how many functional modules end up being arranged on the base body. It is therefore advantageously possible to realize a wide variety of different variants of the application apparatus in particular using the same base body. The location at which a respective functional unit is arranged on the base body is advantageously predefined here by the arrangement of the arrangement positions on the base body. In particular, a functional unit can also comprise a plurality of functional components, which are then arranged in particular at arrangement positions specifically assigned to these functional components. The sum of these arrangement positions is then, in particular, the arrangement position assigned to the functional unit.

Since the above described functional units of the application apparatus designed according to the disclosure are designed in the form of functional modules, the terms functional unit and functional module will also be used interchangeably in the description hereinbelow.

The respective arrangement position on the base body of the application apparatus also advantageously defines the sequence in which an operating step or a station step is carried out by the respective functional module, in particular in relation to the sealing profile being applied. In particular, the arrangement positions for the functional modules assigned to these arrangement positions are predetermined so as to define a processing sequence for the respective further station step, which can be performed by the respective associated functional module, in relation to the first station step. It should be noted here that the term "first station step" only serves to distinguish from the further station steps and does not define any sequence. In particular, the "first station step" need not be the station step which is carried out first of all.

According to an advantageous configuration of the application apparatus, the base body additionally has a plurality of arrangement positions, in particular two or three arrangement positions, for the same functional module, wherein, on the basis of the arrangement position at which the functional module is arranged, it is advantageously also defined that the functional module carried out the associated station step prior to, during or following the application of the sealing profiles.

Since it is therefore advantageously possible to use the same base body to construct different application apparatuses, in particular application apparatuses which differ in respect of the functional scope and/or in respect of station steps being performed, the application apparatus can, in addition, meet different requirements in a cost-effective manner. In particular, the application apparatus here is assigned to a single production station. To this extent, it is advantageously also the case that the application apparatus takes up only the amount of space required for a single production station. To this extent, the application apparatus in particular does not comprise a plurality of production stations which are connected merely structurally to one another, the application of the sealing profile being assigned to the one production station and the further function being assigned to the further production station.

The base body of the application apparatus is made in particular at least partially of a metallic material, and further particularly entirely of a metallic material. In particular, the material(s) is provided is/are aluminium and/or steel. However, it is also conceivable for the base body to consist, in particular, of other materials. The base body can be formed, in particular, in one or more pieces.

According to a further advantageous configuration, the application apparatus comprises a drilling unit as a further functional unit, wherein the drilling unit is advantageously designed to drill holes into the sealing profile. In the case of an application apparatus configured in this way, it is therefore advantageously possible to use a sealing profile with no previously made holes. This therefore advantageously does away with a process step for which an additional processing station is usually provided. It is therefore also advantageously the case that this additional processing station, which usually also requires a dedicated robot, and also the amount of space required for this additional processing station are dispensed with. The drilling unit comprises, in particular, a drill bit and also a drive unit, in order to make the drill bit rotate. It is advantageously also the case that the drilling unit comprises at least one sensor unit designed to monitor a drilling operation. The drilling unit further advantageously comprises a suction-extraction unit, in particular a suction-extraction shroud, which is advantageously designed to extract drilling chips which are generated in particular when the sealing profile is being drilled. The drilling unit is further advantageously designed such that the drill bit of the drilling unit can assume different positioning angles at which a drilling operation is performed. In particular, the drilling unit and/or the drill head, which receives the drill bit, are/is of correspondingly adjustable design. For automatic adjustment, the drilling unit advantageously comprises at least one actuator unit, by means of which the drilling unit and/or the drill head can be adjusted relative to the base body of the application apparatus. This adjustment capability of the drilling axis allows the orientation of the holes to be set advantageously in a manner corresponding to a predefined specification.

In particular, the application apparatus is assigned a control unit, in particular a PLC (PLC: Programmable Logic Controller), wherein this control unit is designed, in particular, to activate the drilling unit for the purpose of performing the drilling operations and, in particular, to activate the roller head and the drilling unit in a coordinated manner, advantageously so that drilling and application of the sealing profile can be performed in a specifically coordinated manner. In particular, provision is made for the control unit to stop the application of the sealing profile for the duration of the drilling. While the drilling operations are being carried out at predefined positions by the drilling unit being activated by means of the control unit, it is therefore advantageously the case that there is no sealing profile being applied.

An advantageous variant therefore makes provision for the drilling unit to be assigned to an arrangement position which defines as a further station step drilling of the sealing profile following application of the sealing profile. This variant is provided, in particular, when the application apparatus is guided by a robot. The drilling unit here is advantageously arranged on the base body such that the drill bit is oriented outwards and, following application of the sealing profile, the drilling unit can make the holes in the sealing profile by virtue of the application apparatus being pivoted. However, the variant can also be provided, in particular, when the application apparatus is fixed on a stationary support, in which case in particular the bodywork part is correspondingly shifted, in particular by means of a robot arm, in relation to the drill bit.

A further advantageous configuration makes provision for the drilling unit to be assigned to an arrangement position which defines as a further station step drilling of the sealing profile during application of the sealing profile. This con-figuration advantageously makes it possible for holes to be made in the sealing profile without cycle-time losses. Drill-ing of the sealing profile during application of the sealing profile here, in particular, does not mean that the holes are made in a sealing-profile portion which is just being applied to a bodywork part. Instead, provision is advantageously made so that, in the case of this variant, the drilling of holes in a first portion of the sealing profile and the application of the second portion of the sealing profile take place at the same time, wherein the drilling unit, in particular, is mounted downstream of the roller head and so holes are drilled in the first sealing-profile portion, which is then applied to a bodywork part by the roller head at a later point in time.

A further advantageous configuration makes provision for the drilling unit to be assigned to an arrangement position which defines as a further station step drilling of the sealing profile prior to application of the sealing profile. Provision is made here, in particular, for the holes to be made in the sealing profile before the sealing profile is fed to a supply unit, which supplies the sealing profile for application thereof.

According to a further advantageous configuration, the application apparatus comprises a cleaning unit as a further functional unit, wherein the cleaning unit is designed, in particular, to clean a receiving surface of the bodywork part, in particular the receiving surface onto which the sealing profile is to be subsequently applied. The cleaning is intended to remove, in particular, residues, in particular residues of wax, which could prevent reliable substance-to-substance bonding of the sealing profile to the bodywork part. The cleaning unit advantageously does away with the need for a separate cleaning station along with the associated robot and associated station boundary.

In particular, provision is made for the cleaning unit to be assigned to an arrangement position which defines as a further station step cleaning of a receiving surface of the bodywork part prior to application of the sealing profile. This variant is provided, in particular, when the application apparatus is guided by a robot. The cleaning unit here is advantageously arranged on the base body such that a cleaning roller of the cleaning unit is oriented outwards and the cleaning roller is moved along relative to the receiving surface to be cleaned. However, this variant can also be provided, in particular, when the application apparatus is fixed on a stationary support, in which case in particular the bodywork part is correspondingly shifted, in particular by means of a robot arm, relative to the cleaning unit.

In the case of an advantageous variant, the cleaning unit is assigned to an arrangement position which defines as a further station step cleaning of a receiving surface of a bodywork part during application of the sealing profile. This configuration advantageously makes it possible for the receiving surface to be cleaned without cycle-time losses. Cleaning of the receiving surface during application of the sealing profile means that, in the case of this variant, the cleaning of a first portion of the receiving surface and the application of the sealing profile to a second, already pre-viously cleaned portion take place at the same time, wherein in particular the cleaning unit is mounted upstream of the roller head. Of course, in the case of this configuration, provision is made, in particular, so that, when processing of a bodywork part begins, in the first instance, for a short period, cleaning takes place without sealing profile being applied at the same time and when processing ends, in particular for a certain period, sealing profile is applied without cleaning taking place at the same time.

In particular, provision is made for the cleaning unit to comprise a plurality of cleaning components arranged at different arrangement positions predefined for this purpose. The cleaning unit advantageously comprises the following cleaning components individually or in possible combina-tions: a cleaning belt, in particular a nonwoven cleaning fabric; a cleaning roller, over which the cleaning belt is advantageously guided for the purpose of cleaning the receiving surface; a supply roll, from which clean cleaning belt is supplied; a take-up roll, which takes up cleaning belt which has been used for cleaning; at least one drive unit, in particular at least one electric drive unit with corresponding connections and lines, further particularly drives for the supply roll and the take-up roll, further particularly a drive for lateral displacement travel of the cleaning roller; a carriage, in particular a carriage for lateral displacement travel of the cleaning roller; a contact-pressure cylinder for applying pressure to the cleaning roller; at least one sensor unit; at least one fastening element.

The application apparatus further advantageously com-prises at least one sensor unit as at least one further func-tional unit, wherein the sensor unit is designed, in particular, to monitor a station step being performed. In particular, a plurality of sensor units are provided, and they can each constitute a functional unit. It is also possible, however, for sensor units to be provided in the form of a supplementary component for a functional unit. The respective sensor unit is advantageously assigned to an arrangement position which defines as a further station step monitoring of a station step being performed while the station step to be monitored is being performed, so that the situation where a station step is not performed in the predefined manner can be reacted to, in particular, straightaway. As an alternative, or in addition, provision is made for the respective sensor unit to be assigned to an arrangement position which defines as a further station step monitoring of a station step having been performed following the station step to be monitored having been performed. In particular, at least one evaluation unit is provided, this unit receiving the data sensed by the sensors of the sensor units and evaluating same. It is possible here to provide, in particular, a central evaluation unit for all the sensor units. In particular, however, provision is also made for at least some of the sensor units to comprise a respective evaluation unit.

An advantageous configuration provides a sensor unit in the form of a camera unit, wherein the camera unit can comprise, in particular, a plurality of cameras. In particular, the camera is a smart camera. The camera unit advanta-geously comprises an evaluation unit for evaluating the captured image data. The camera unit is advantageously designed to detect the spatial position of the bodywork part to which the sealing profile is to be applied, in particular the spatial position of the bodywork part in relation to the application apparatus, in particular when the bodywork part is accommodated in a so-called hanger. The camera unit advantageously makes it possible to determine the position of the bodywork part in space in the hanger when the sealing profile is being rolled on. The evaluation unit advantageously supplies correction values which are derived from these data and are transmitted, in particular, to a controller for the robot on which the application apparatus is arranged.

According to a further advantageous configuration, the application apparatus comprises a sensor unit for checking the position of the sealing profile applied to a bodywork part as a sensor unit. In particular, provision is made for this sensor unit to comprise a laser profile sensor. This sensor unit further advantageously comprises an evaluation unit for processing the data sensed by means of the sensor of this sensor unit, in particular for storing the data and/or for evaluating the data and/or for processing purposes for visualisation of the data. In particular, provision is made so that this sensor can sense and store, during the application of the sealing profile, the position which the sealing profile applied to the receiving surface of the bodywork part assumes relative to the bodywork part. It is advantageously possible, by means of the sensor unit, for the data sensed in this respect to be analysed and preferably processed for visualisation by means of an image-display device, in particular by means of an external image-display device. In particular, the data processed in this way is displayed on an image-display device. It is advantageously the case that this sensor unit is designed, in addition, for statistical evaluation of the sensed data, in particular for statistical evaluation of the sensed data for process-monitoring purposes.

A further advantageous configuration provided is one in which the application apparatus comprises a sensor unit for checking a contact-pressure force, in particular a sensor unit for checking a contact-pressure force during application of a sealing profile to a receiving surface of a bodywork part, as a sensor unit. In particular, provision is made for this sensor unit to be designed to check the contact-pressure force of a contact-pressure unit of the roller head, in particular of a contact-pressure unit in the form of a contact-pressure roller, wherein the sealing profile is advantageously guided over the contact-pressure unit. In particular, provision is made for this sensor unit to comprise a load pin for this purpose. This sensor unit further advantageously comprises an evaluation unit for processing the data sensed by means of the sensor of the sensor unit, in particular for storing the data and/or for evaluating the data and/or for processing purposes for visualisation of the data. In particular, provision is made so that this sensor unit can sense and store, during the application of the sealing profile, the contact-pressure force by which the sealing profile is applied to the receiving surface of the bodywork part. It is advantageously possible, by means of the sensor unit, for the data sensed in this respect to be analysed and preferably processed for visualisation by means of an image-display device, in particular by means of an external image-display device. In particular, the data processed in this way is displayed on an image-display device. It is advantageously the case that this sensor unit is designed, in addition, for statistical evaluation of the sensor data, in particular for statistical evaluation of the sensed data for process-monitoring purposes.

A further advantageous configuration makes provision for the application apparatus to comprise a sensor unit for measuring an intended length of a sealing profile to be applied to a receiving surface of a bodywork part as a sensor unit. Since the sealing profile is provided, in particular, in the form of an endless profile, it is advantageously possible, by means of this sensor unit, for the predefined length of the sealing profile for a predefined bodywork part to be determined and for the sealing profile therefore to be severed at the correct location. In particular, provision is made for this sensor unit to comprise a measuring wheel, in particular a measuring wheel in the form of a toothed wheel and/or a friction wheel. This sensor unit further advantageously comprises a rotary encoder. This sensor unit further advantageously comprises an evaluation unit for processing the data sensed by means of the sensor of this sensor unit, in particular for storing the data/or for evaluating the data and/or for processing purposes for visualisation of the data. In particular, provision is made so that this sensor unit can sense and store, during the application of the sealing profile, the sealing length of the sealing profile applied to the receiving surface of the bodywork part. It is advantageously possible, by means of the sensor unit, for the data sensed in this respect to be analysed and preferably processed for visualisation by means of an image-display device, in particular by means of an external image-display device. In particular, the data processed in this way is displayed on an image-display device. It is advantageously the case that this sensor unit is designed, in addition, for statistical evaluation of the sensed data, in particular for statistical evaluation of the sensed data for process-monitoring purposes. In particular, it is thus possible, by means of this sensor unit, for a buckling profile to be documented in a reproducible manner for the purposes of process control and error analysis. In addition, this sensor unit advantageously provides for permanent filling-level monitoring of a supply unit, in particular of a seal magazine, which supplies the endless sealing profile. In addition, this sensor unit advantageously documents the amount of sealing profile used up.

According to a further advantageous configuration, provision is made for the application apparatus to have a sensor unit for measuring a floating position of a contact-pressure unit of the application apparatus as a sensor unit. The contact-pressure unit here is, in particular, a contact-pressure roller. In particular, provision is made for this sensor unit to comprise a laser distance sensor. It is advantageously the case that a contact plate is arranged, in addition, on the contact-pressure unit, the laser of the laser distance sensor advantageously being aligned with the contact plate. This sensor unit further advantageously comprises an evaluation unit for processing the data sensed by means of the sensor of this sensor unit, in particular for storing the data and/or for evaluating the data and/or for processing purposes for visualisation of the data. In particular, provision is made so that this sensor unit can sense and store, the position of the contact-pressure unit during the application of the sealing profile. It is advantageously possible, by means of the sensor unit, for the data sensed in this respect to be analysed and preferably processed for visualisation by means of an image-display device, in particular by means of an external image-display device. In particular, the data processed in this way is displayed on an image-display device. It is advantageously the case that this sensor unit is designed, in addition, for statistical evaluation of the sensed data, in particular for statistical evaluation of the sensed data for process-monitoring purposes. In particular, this sensor unit provides for improved control of contact-pressure force. It is further advantageously the case that this sensor unit can prevent the end position of the movably mounted contact-pressure unit from being reached. This advantageously makes it possible to prevent damage to the application apparatus and/or to the workpiece to be processed.

A further advantageous configuration of the application apparatus provides a severing unit as a further functional unit, wherein the severing unit is designed to sever a sealing profile. In particular, the severing unit, for severing the sealing profile, comprises at least one cutting blade. The severing unit is advantageously designed to shorten an endless sealing profile in each case to the length of sealing profile which is necessary for a predetermined bodywork part, in particular at the end of an application operation for a bodywork part. The severing unit is advantageously controlled by the sensor unit for measuring a length of sealing profile.

In particular, the severing unit is assigned to an arrangement position, on the base body of the application apparatus, which defines as a further station step severing of the sealing profile during application of the sealing profile. Severing of the sealing profile during application of the sealing profile here means that, in the case of this variant, the severing of the sealing profile and the application of the sealing profile take place at the same time at two different portions of the sealing profile, wherein in particular the severing unit is mounted downstream of the roller head. A severed end of the sealing profile is applied as a later point in time to the receiving surface of a bodywork part.

According to a further advantageous configuration, the base body of the application apparatus has an arrangement interface. The arrangement interface here is advantageously designed to arrange the base body, and therefore in particular the application apparatus, on a station support or on a movable robot arm. The arrangement interface therefore advantageously means that the application apparatus can be used even more flexibly, that is to say in particular in the form of a stationary application apparatus, wherein a bodywork part is guided in a suitable manner along the application apparatus for processing purposes, and in particular in the form of a mobile, robot-guided application apparatus, which is guided in a suitable manner along a bodywork part for processing purposes.

In particular, here a variant makes provision for the base body of the application apparatus to be arranged on a station support via the arrangement interface. The means provided for arrangement on a station support is, in particular, a mounting stand for the application apparatus, so that the roller head of the application apparatus is, in particular, an elevated roller head. A further variant, further advantageously makes provision for the base body of the application apparatus to be arranged on a movable robot arm via the arrangement interface. The arrangement on a movable robot arm means that the application apparatus is advantageously guided by a robot and therefore, in particular, it is also the case that the roller head of the application apparatus is a robot-guided roller head.

Provision is further advantageously made with the base body of the application apparatus to have cable guides, in particular entry and/or exit openings, in particular cable guides for cables for the at least one further functional unit. This means that the construction of the application is advantageously further simplified and therefore cost-effective. In particular, provision is made for arrangement positions and/or cable guides for a specific functional unit on the base body to be identified in a particular way, in particular by colour. This advantageously simplifies the assignment of the respective functional module to the respective arrangement position. As an alternative, or in addition, provision is made for arrangement locations of functional components of one functional module to differ from the arrangement locations of functional components of another functional module, and so it is advantageously ensured by technical means that the functional modules can only be arranged at arrangement positions envisaged for them.

The modular kit for constructing an application apparatus, and also proposed for the purpose of achieving the aforementioned object, comprises a multiplicity of modules with predefined properties, wherein different variants of an application apparatus can be constructed from the modules. There is advantageously no need for the modules to be adapted for this purpose. In particular, the kit comprises basic modules, which are always to be used for constructing an application apparatus, and supplementary modules, which can optionally be used for constructing an application apparatus. The basic modules advantageously comprise a base body and a roller head. The supplementary modules advantageously comprise a drilling unit, a cleaning unit, at least one sensor unit and a severing unit. In particular, it is also possible for further basic modules and/or further supplementary modules to be provided. To this extent, an application apparatus constructed on the basis of the modular kit always comprises the basic modules of the kit. An application apparatus constructed on the basis of the modular kit can comprise a number of supplementary modules which meets respective requirements, wherein, it is also possible, in particular, for the application apparatus to comprise no supplementary modules or one or all of the supplementary modules of the kit. The modular construction advantageously provides for a high level of flexibility, wherein the effort and therefore the costs involved for individualisation are advantageously at a low level.

In particular, provision is made for the basic modules and the supplementary modules to be designed to construct an application apparatus according to the disclosure, and it is therefore possible to construct, in particular, an application apparatus which has the above described features individually or in combination. In particular, the base body of the kit has the above described features of the base body, of the application apparatus designed according to the disclosure, individually or in combination. The supplementary modules of the kit advantageously have the above described features of the functional units or of the functional modules, of the application apparatus designed according to the disclosure, individually or in combination.

Like parts are generally provided with like reference signs in the various figures and are therefore also each explained only in combination with one of the figures.

Figure 3:
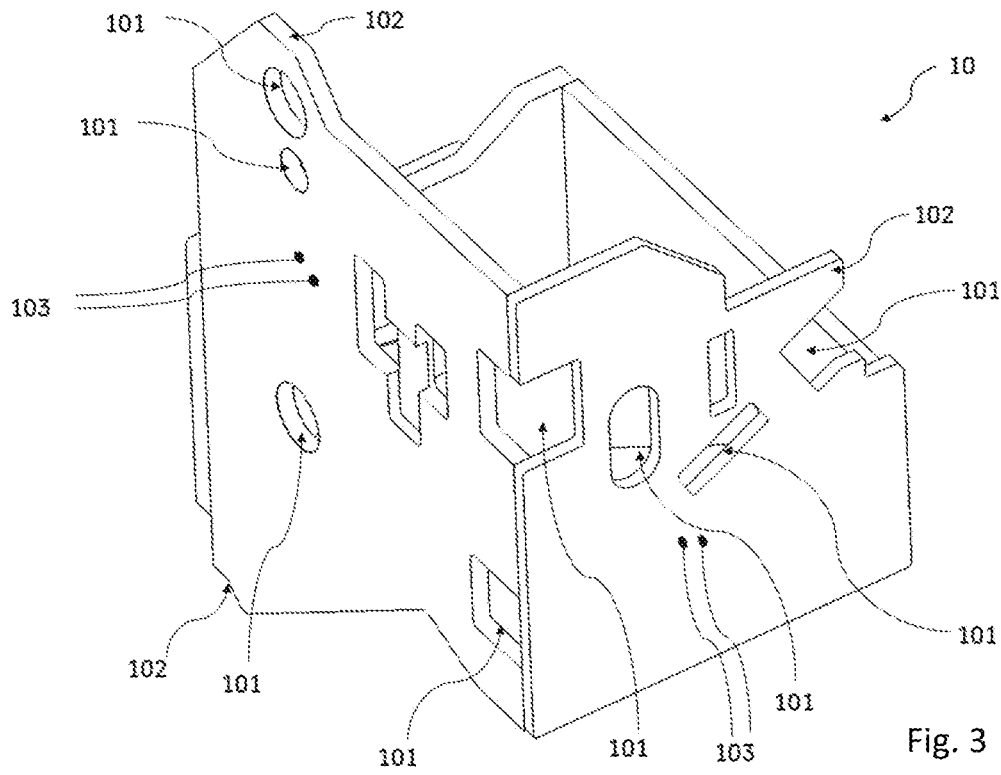
FIG. 3 shows a perspective view of another embodiment of an application apparatus according to the disclosure.

FIG. 1 illustrates one embodiment of an application apparatus 1 according to the disclosure which is designed to apply a sealing profile 200 to a bodywork part. The application apparatus 1 has a base body 10, which can be formed in particular from aluminium sheet. An advantageous configuration of a base body 10 for an application apparatus designed according to the disclosure is shown in FIG. 3.

A roller head 2 is arranged on the base body 10 and is designed to apply the sealing profile 200 to a receiving surface of a bodywork part, this forming a first station step. The roller head 2 comprises a multiplicity of components, in particular a supply unit 22, which supplies the sealing profile 200 in the form of an endless profile, various rollers 23 for guiding the sealing profile 200, drive units 24 for driving rollers 23 for conveying the sealing profile 200, and a contact-pressure unit 21, which presses the sealing profile 200 onto the receiving surface.

The base body 10 also comprises an arrangement interface 12, which in the illustration of FIG. 1 is directed away from the viewer. An advantageous configuration of the arrangement interface 12 will be explained in more detail with reference to FIG. 14 to FIG. 16. In the embodiment illustration in FIG. 1, the base body 10 is arranged on a movable robot arm 19 via the arrangement interface 12. The robot arm 19 therefore allows the roller head 2 for the purpose of applying the sealing profile 200 to a bodywork part, which can be arranged for example in a hanger, to be guided along the receiving surface of the bodywork part.

Furthermore, a severing unit 15 as a further functional unit is arranged on the base body 10 in addition to the roller head 2. The severing unit 15 here is designed in the form of a functional module and comprises a blade which can sever the sealing profile 200, so that the sealing profile 200 is precisely the length envisaged for the respective bodywork part. In particular, the severing unit 15 comprises an actuator unit, which can be activated in order for the sealing profile 200 to be severed. The severing unit 15 is arranged at a predefined arrangement position 1115 of the base body 10 in relation to the roller head 2 such that a further station step defined is that of severing the sealing profile 200 during application of the sealing profile 200. This means that, while the sealing profile 200 is being applied to the receiving surface of the bodywork part by means of the roller head 2, the sealing profile 200 is severed by means of the severing unit 15 at a suitable point in time.

The base body 10 of the application apparatus 1 additionally has a plurality of further predetermined arrangement positions 11, wherein a specific arrangement position 11# from the plurality of predetermined arrangement positions 11 is assigned a respective further functional module, which can likewise be arranged on the base body 10. In this embodiment, the base body has an arrangement position 1131 for a drilling unit 3, wherein this arrangement position 1131 makes it possible for holes to be drilled in the sealing profile 200 by means of the drilling unit 3 during application of the sealing profile 200. Furthermore, the base body 10 nevertheless also has an alternative arrangement position 1132 for a drilling unit 3, wherein this arrangement position 1132 makes it possible for holes to be drilled in the already applied sealing profile 200 by means of the drilling unit 3, that is to say for holes to be drilled following application of the sealing profile 200. The drill bit of the drilling unit here can advantageously be aligned in different ways so that it is advantageously possible for the drill bit of the drilling unit 3 to be precisely positioned via the drilling unit 3. In addition, this advantageously makes it possible to predefine different positioning angles for the holes.

The base body 10 also has arrangement positions 114 for a cleaning unit 4, by means of which the receiving surface for the sealing profile 200 can be cleaned prior to the application of the sealing profile. The base body 10 further comprises arrangement positions 119 for a sensor unit 9 for checking a position of a bodywork part in space, an arrangement position 115 for a sensor unit 5 for checking the position of the sealing profile 200 applied to a bodywork part, an arrangement position 116 for a sensor unit 6 for checking a contact-pressure force during application of the sealing profile 200, an arrangement position 117 for a sensor unit 7 for measuring a sealing-profile length during application of the sealing profile 200, and an arrangement position 118 for a sensor unit 8 for measuring a floating position of the contact-pressure unit 21.

FIG. 2 illustrates a further embodiment of an application apparatus 1 designed according to the disclosure and having the same base body 10 as the application apparatus 1 according to FIG. 1, although all the arrangement positions 11 have been fitted with the corresponding functional modules. Therefore, in addition to the application apparatus 1 according to FIG. 1, the application apparatus 1 according to FIG. 2 comprises a drilling module 3, a cleaning module 4 with components arranged at the corresponding arrangement positions 114, a sensor module 5 for checking the position of the sealing profile 200 applied to a bodywork part, a sensor module 6 for checking a contact-pressure force of the contact-pressure unit 21, a sensor module 7 for measuring the length of the sealing profile, a sensor module 8 for measuring the floating position of the contact-pressure unit 21, and a sensor module 9 for checking a position of a bodywork part in space, wherein the sensor module 9 comprises two cameras units arranged at the respective arrangement positions 119.

The respective arrangement positions 11# of the functional modules 3, 4, 5, 6, 7, 8, 9, 15 relative to one another advantageously—at least to a certain extent—defines as a station step a processing sequence for the station step to be performed by the respective functional module, in particular in respect of the application of the sealing profile.

An embodiment for the base body 10 of the application apparatus 1 illustrated in FIG. 1 and FIG. 2 is shown in FIG. 3. In this embodiment, the base body 10 comprises four metal plates, in particular aluminium plates, which are connected to one another at right angles, so that the base body 10 has a rectangular outline. The metal plates of the base body 10 here are of different configurations since they are adapted for having the respective functional modules arranged on them. In addition, the metal plates each have apertures 101 and/or protrusions 102 and/or drilled holes 103, which form the arrangement positions 11. Furthermore, it is also possible for the base body 10 to have, in particular, drilled holes for cable guides.

Different functional units 3, 4, 5, 6, 7, 8, 9, designed in the form of a functional modules, in particular for use with the application apparatus 1 illustrated in FIG. 1, will be explained in more detail with reference to FIG. 4a to FIG. 11b, wherein FIG. #a shows the respective functional module in the form of a constituent part of an application apparatus 1 designed according to the disclosure and FIG. #b shows the respective functional module on its own in each case.

The respective functional modules 3, 4, 5, 6, 7, 8, 9 can also be, in particular, a constituent part of a modular kit for constructing an application apparatus 1, wherein the modular kit comprises a multiplicity of modules with predefined properties, from which different variants of the application apparatus 1 can be constructed. This modular kit advantageously comprises a base body 10 and a roller head 2 as basic modules, which are used for constructing each application apparatus 1. The functional modules 3, 4, 5, 6, 7, 8, 9, 15, in contrast, are advantageously supplementary modules, which can optionally be used individually or in any desired combination for constructing an application apparatus, in particular in line with the customer's requirements. If use is made of endless sealing profiles, a variant makes provision, in particular, for the severing unit 15, rather than being a supplementary module, to be a basic module which each application apparatus 1 comprises.

Figure 4A:
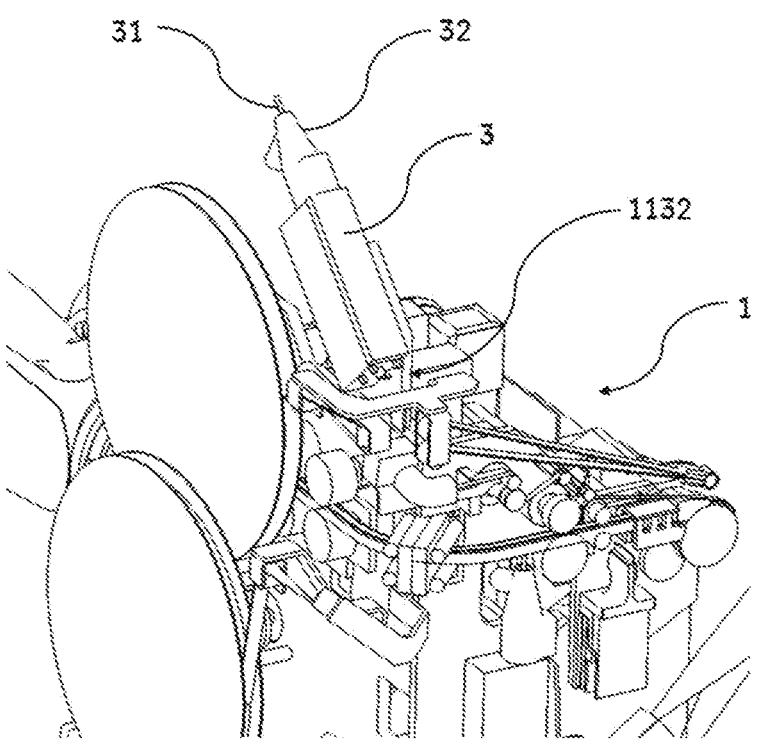
FIGS. 4a and 4b show perspective views of an embodiment of a functional module in the form of a drilling unit.
Figures 4B, 5A, 5B:
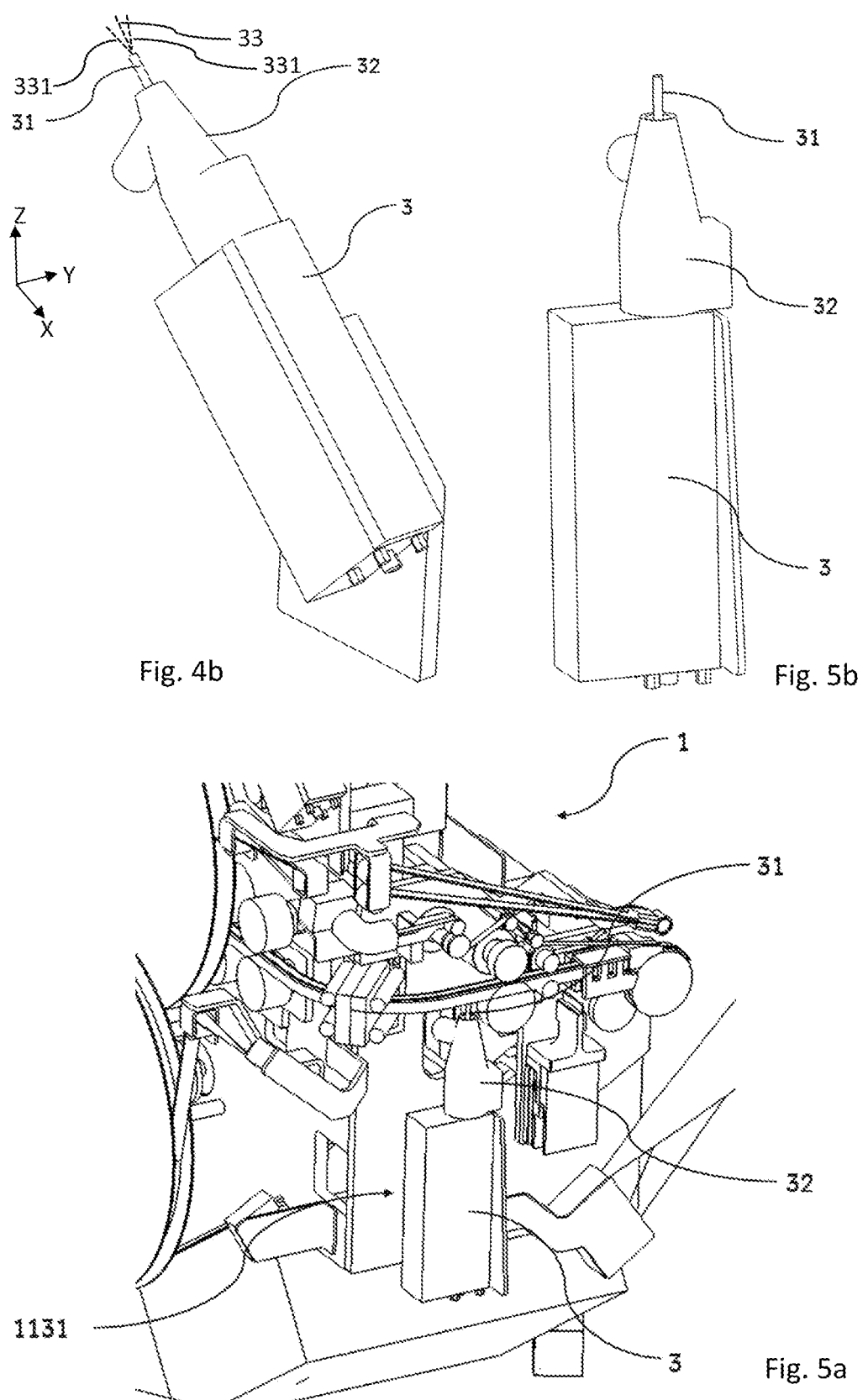
FIGS. 5a and 5b show a perspective and a side view of a further embodiment of a functional module in the form of a drilling unit.

FIG. 4b shows an embodiment of a functional module in the form of a drilling unit 3, wherein the drilling unit 3 comprises a drill bit 31, which can be driven by means of a drive unit and is intended for drilling holes in a sealing profile 200, and a suction-extraction shroud 32. The suction-extraction shroud 32 can advantageously be used for extracting bits of material left over from drilling. The holes drilled into the sealing profile function, in particular, as water-drainage holes for subsequent use of the bodywork part in the motor vehicle. FIG. 4b, in addition, shows the drilling axis 33 of the drill bit 31 in the current alignment of the drill bit 31 symbolically in the form of a dashed line. This drilling axis 33 can be adjusted, in particular in respect of the angle of the drill bit 31, by means of an actuator unit, not shown explicitly in FIG. 4b. FIG. 4b shows, by way of example, two drilling axes 331 with adjusted alignment. In particular, provision is made for the drilling axis 33 of the drill bit 31 to be adjustable in a first direction in space X and in a second direction in space Y and/or in a third direction in space Z.

FIG. 4a shows the drilling module 3 arranged at a first arrangement position 1132 on the base body 10 of an application apparatus 1, wherein this arrangement position 1132 defines as a further station step drilling of the sealing profile 200 following application of the sealing profile 200. The drilling unit 3 advantageously comprises actuator units, wherein the drill bit 31 of the drilling unit 3 can be adjusted relative to the base body 10 of the application apparatus 1, preferably in all three directions in space, by means of the actuator units.

FIG. 5a, in contrast, shows a further embodiment, in which the drilling module 3 is arranged at a second arrangement position 1131 on the base body 10 of an application apparatus 1. This arrangement position 1131 allows as a further station step drilling of the sealing profile 200 during application of the sealing profile 200. The drilling module 3 is illustrated in a side view in FIG. 5b.

Figure 6A:
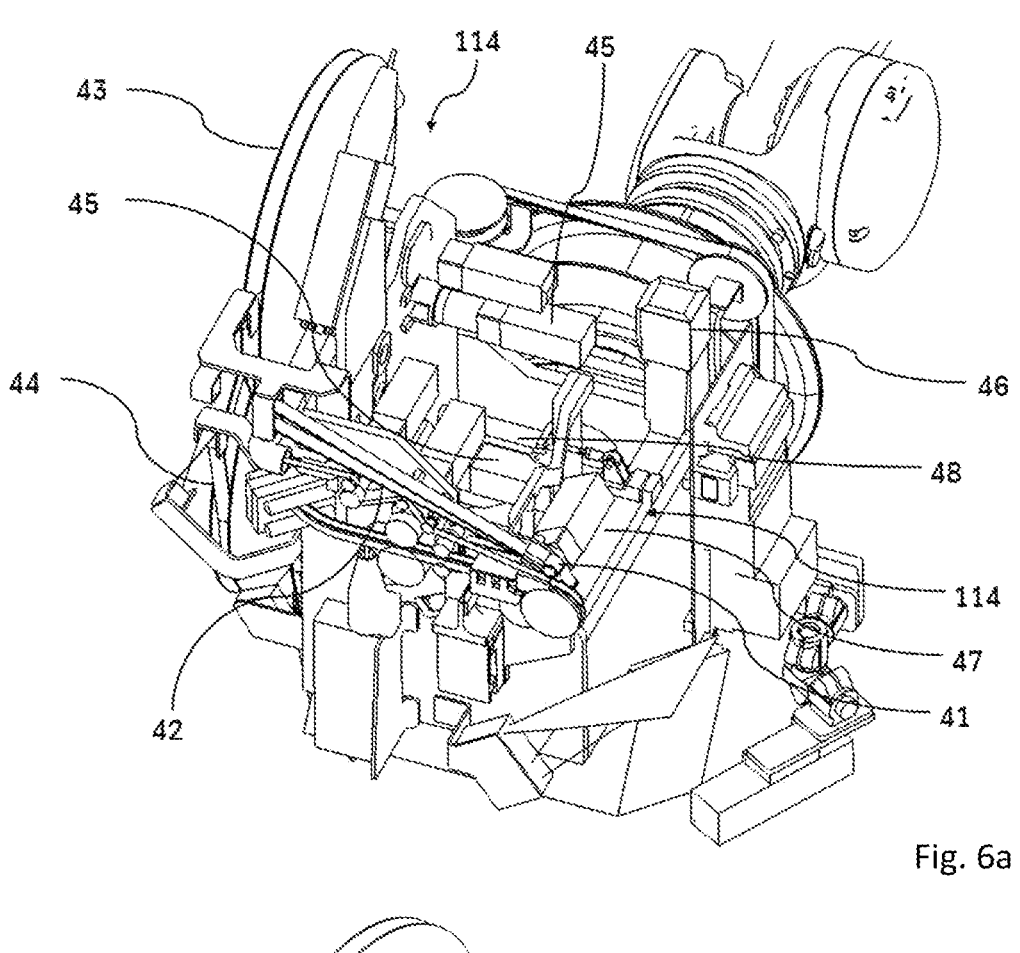
FIGS. 6a and 6b show perspective views of an embodiment of a functional module in the form of a cleaning unit.
Figure 6B:
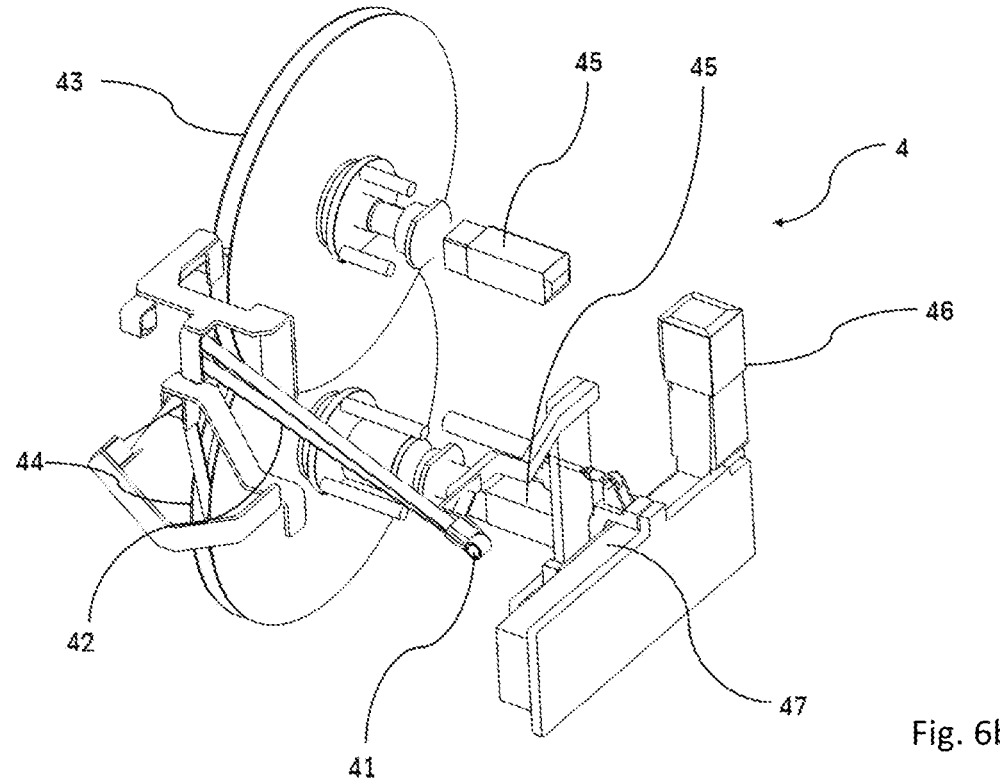

FIG. 6b illustrates an embodiment of a cleaning module 4, which is designed to clean the receiving surface of the bodywork part to which the sealing profile 200 is to be applied. In the case of the application apparatus 1 shown in FIG. 6a, the cleaning module 4 is arranged at an arrangement position 114 which is distributed over various regions of the base body 10, or in other words the components of the cleaning module 4 are arranged at a plurality of arrangement positions 114 on the base body 10. The arrangement position 114 here allows, or the arrangement positions 114 allow, as a further station step cleaning of a receiving surface of the bodywork part by means of the cleaning module 4 during application of the sealing profile 200. In this embodiment, the components which the cleaning module 4 comprises are in the form of a cleaning roller 41, over which a cleaning belt 42, in particular a nonwoven cleaning fabric, is guided for the purpose of cleaning the receiving surface. The cleaning belt 42 is then supplied in the form of a clean cleaning belt 42 from a roll 43, in particular a supply roll. Dirty cleaning belt 42 already used for cleaning purposes is taken up by a roll 44, in particular a take-up roll. The rolls 43, 44, are driven by a drive unit 45. In addition, further components which the cleaning module 4 comprises are in the form of a carriage 47, which can provide for lateral displacement travel of the cleaning roller 41, the carriage 47 being driven by a further drive unit 46. The cleaning module 4 additionally comprises a contact-pressure cylinder 48, which presses the cleaning roller 41 against the receiving surface to be cleaned.

FIG. 7b shows an embodiment of a sensor unit 9 for checking a position of a bodywork part in space. In this embodiment, the sensor unit 9 comprises two camera units retained by adjustable retaining devices 91. FIG. 7a illustrates how the sensor unit 9 is arranged with the retaining devices 91 at the arrangement positions 119 of the base body 10 of an application apparatus 1. The sensor unit 9 is advantageous in particular, when the application apparatus 1 is guided by a robot 19 for applying the sealing profile 200, wherein data relating to the bodywork-part position is advantageously supplied to a control unit of the robot 19 by the sensor unit 9, and so a sealing profile 200 can advantageously be applied to the bodywork part with a high level of precision.

Figure 8A:
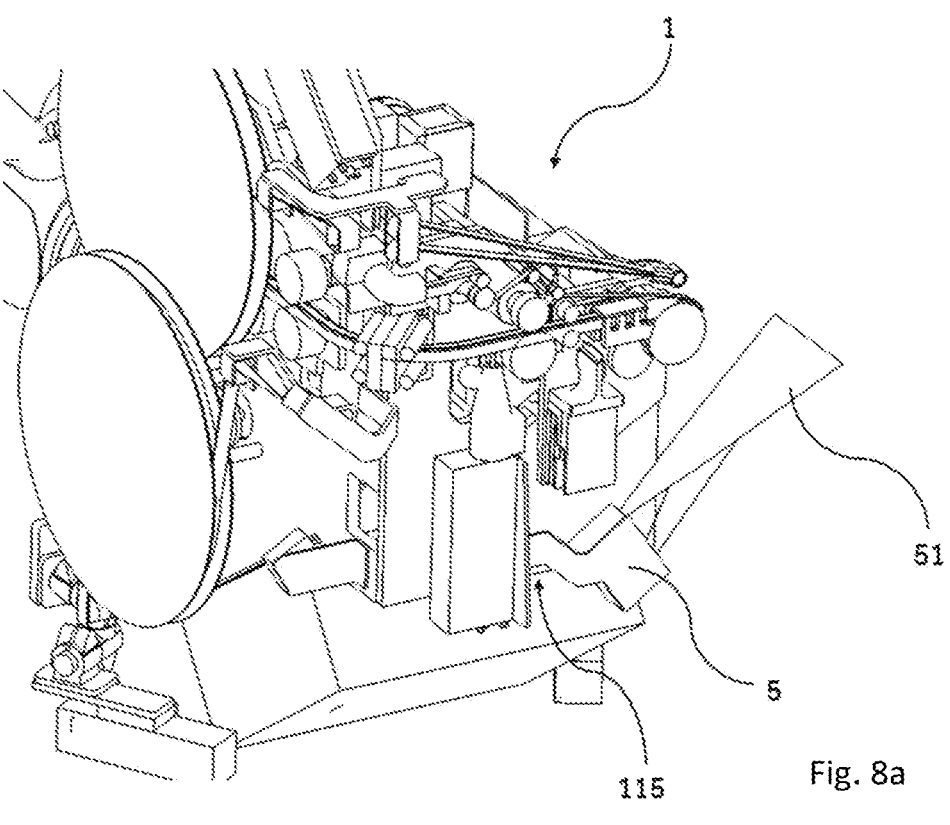

FIG. 8b shows an embodiment of a sensor unit 5 for checking the position of the sealing profile 200 applied to a bodywork part, wherein, in this embodiment, the sensor unit 5 is designed in the form of a laser profile sensor. FIG. 8a illustrates an application apparatus 1 with the sensor unit 5, wherein the sensor unit 5 is arranged at the arrangement position 115 envisaged for it on the base body 10 of the application apparatus 1. The arrangement position 115 and also the orientation of the sensor unit 5 here are determined such that a sensing region 51 of the sensor unit 5 is oriented in such a manner that the position of the sealing profile 200 relative to the bodywork part can be sensed and stored during the application of the sealing profile 200 to the bodywork part. The corresponding data can then advantageously be analysed directly, so that process monitoring is realised with only a slight time lag in relation to the application operation. In particular, it is thus possible to monitor whether the sealing profile 200 has been placed within admissible tolerances on the receiving surface of the bodywork part. Should a deviation in the position of the sealing profile 200 from predefined desired values be detected, a warning signal is advantageously generated.

Figure 9A:
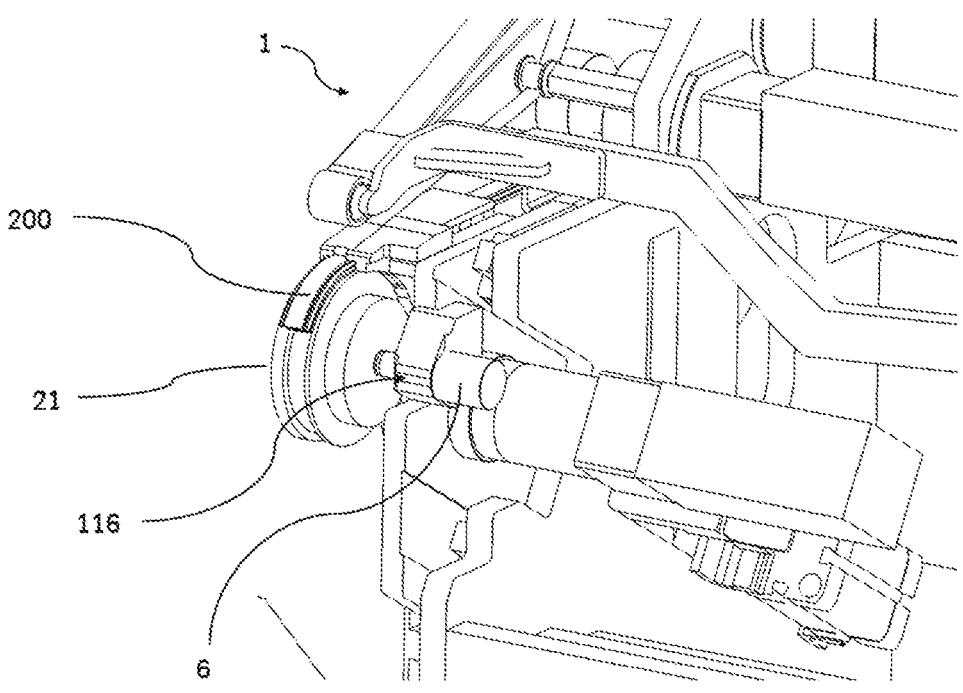

FIG. 9b shows an embodiment of a sensor unit 6 for checking a contact-pressure force, wherein, in this embodiment, the sensor unit 6 is designed in the form of a load pin. As a result of the arrangement position 116 illustrated in FIG. 9a on the base body 10 of the application apparatus 1, so as to realise a direct connection between the load pin and the contact-pressure unit 21, which is designed in the form of a contact-pressure roller, it is possible to sense the contact-pressure force of the contact-pressure unit 21 and therefore of the sealing profile 200 during application of the sealing profile 200 to a receiving surface of a bodywork part. This advantageously makes it possible to sense a reproducibly documented (contact-pressure) force profile which can be used, in particular, for process control and error analysis.

Figure 10B:
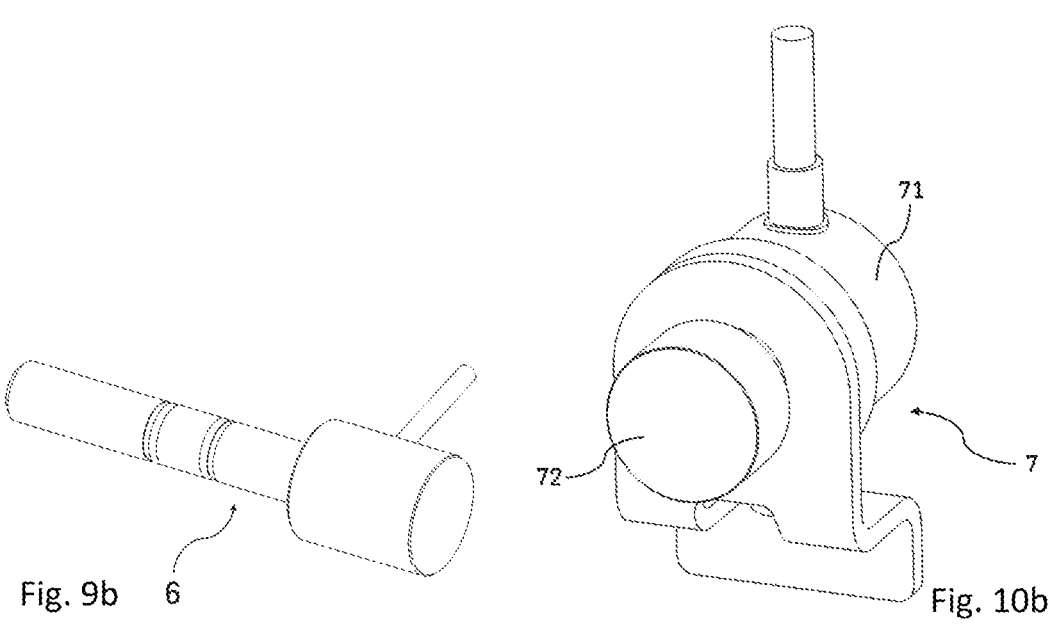
FIGS. 10a and 10b show perspective views of an embodiment of a functional module in the form of a sensor unit for measuring a length of a sealing profile.
Figure 10A:
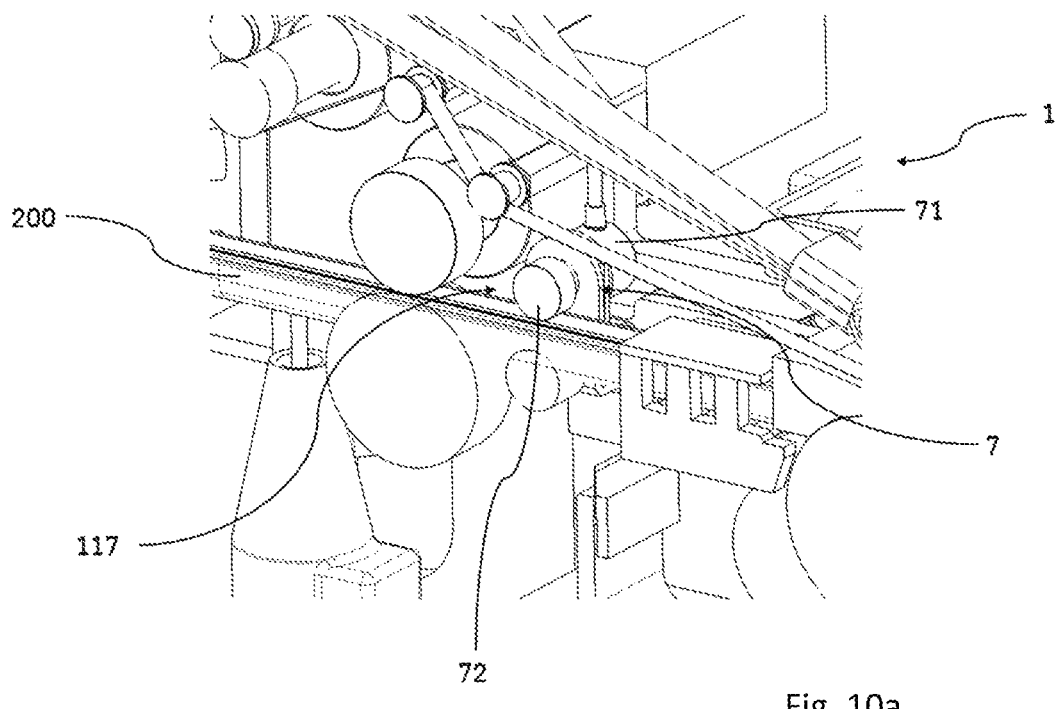

FIG. 10b shows an embodiment of a sensor unit 7 for measuring a length of the sealing profile 200, wherein the sensor unit determines, in particular, the intended length of the sealing profile 200 to be applied to a receiving surface of a bodywork part. In this embodiment, the sensor unit 7 comprises, for this purpose, a rotary encoder 71 and a measuring wheel 72, which is connected to the encoder. The measuring wheel 72 here is driven by the conveying action of the sealing profile 200, wherein the rotary encoder 71 senses the revolutions of the measuring wheel 72. FIG. 10a shows the arrangement of the sensor unit 7 within the application apparatus 1. The sensor unit 7 here is arranged at the arrangement position 117 predetermined for the sensor unit 7. The arrangement position 117 makes it possible here for the sensor unit 7 to sense and store the length of the sealing profile during application of the sealing profile 200. In particular, this provides for permanent filling-level monitoring of the supply unit 22 of the sealing profile 200. Furthermore, the amount of sealing profile used up can easily be documented.

Figures 11A, 11B:
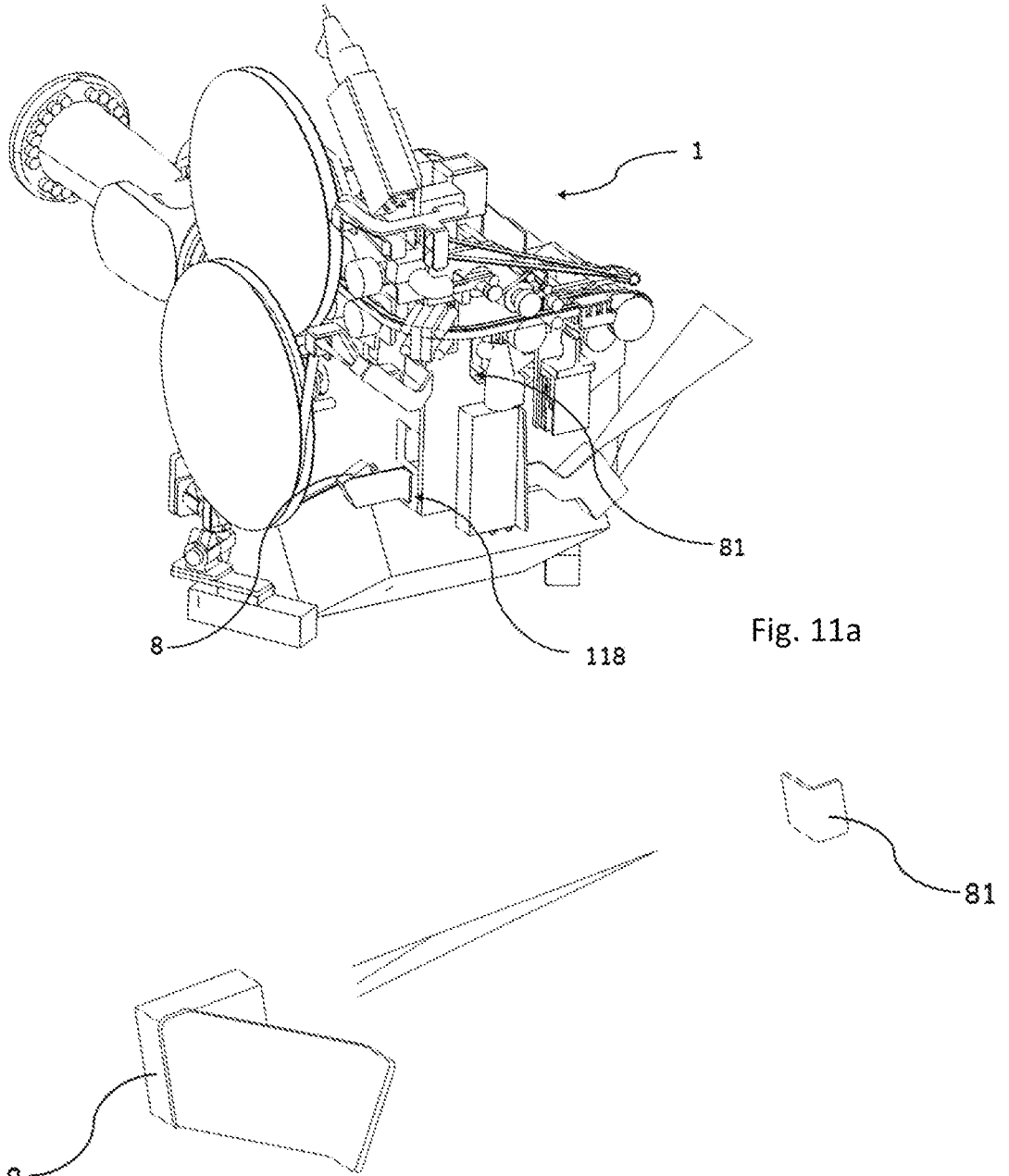
FIGS. 11a and 11b show perspective views of an embodiment of a functional module in the form of a sensor unit for measuring a floating position of a contact-pressure unit.

FIG. 11b shows an embodiment of a sensor unit 8 for measuring a floating position of the contact-pressure unit 21 of the application apparatus 1. In this embodiment, the sensor unit 8 is designed in the form of a laser distance sensor, wherein, in this embodiment, the sensor unit 8 additionally comprises a contact plate 81, with which the laser of the laser distance sensor is aligned. The contact plate 81 here is coupled mechanically to the contact-pressure unit 21, wherein the floating position of the contact-pressure unit 21 can be measured via a sensed change in position of the contact plate 81. The arrangement of the contact plate 81 on an application apparatus 1 is shown in FIG. 11*a*. This sensor unit 8 here is arranged at the associated arrangement position 118 of the base body 10 of the application apparatus 1. The sensor unit 8 advantageously provides for improved regulation of contact-pressure force. In addition, damage can be avoided, since the situation where the end positions of the contact-pressure unit 22 are reached is prevented.

Figures 12, 13:
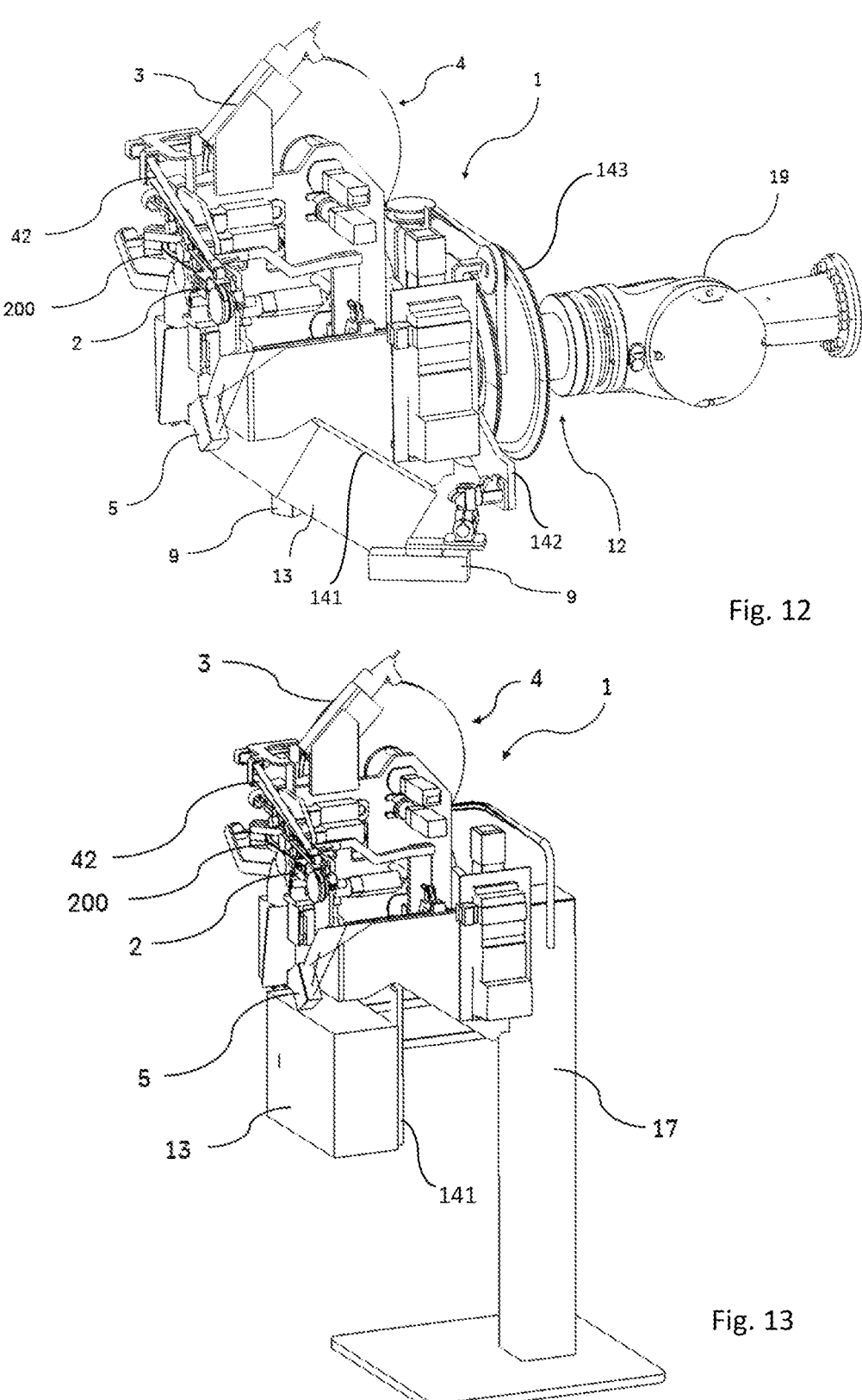
FIG. 12 shows a perspective view of a further embodiment of an application apparatus designed according to the disclosure and having a movable robot arm.
FIG. 13 shows a perspective view of a further embodiment of an application apparatus designed according to the disclosure and having a stationary mounting stand.

FIG. 12 and FIG. 13 each illustrate a further embodiment of an application apparatus 1 designed according to the disclosure. In the case of the configuration according to FIG. 12, the base body 10 of the application apparatus 1 is arranged on a robot arm 19 via an arrangement interface 12 and, in the case of the configuration according to FIG. 13, the base body 10 of the application apparatus 1 is arranged on a station support 17 via an arrangement interface 12, the station support 17 being designed in the form of a mounting stand. In the case of the configuration according to FIG. 12, provision is made for the bodywork part to which the sealing profile 200 is to be applied to be fixed, in particular in a hanger, and for the roller head 2 and also the further functional units 3, 4, 5 provided by the application apparatus 1 to be guided along the bodywork part by means of the robot arm 19 for the purpose of performing the respective station steps. The position of the bodywork part in space relative to the application apparatus 1 here is sensed by means of the camera units of the sensor unit 9, and the robot arm 19 is controlled correspondingly. In contrast, in the case of the configuration according to FIG. 13, the application apparatus 1 is fixed on the station support and a bodywork part to be processed is guided along the roller head 2 and the further functional units 3, 4, 5 of this application apparatus 1.

These differences between the application apparatuses 1 according to FIG. 12 and FIG. 13 each give rise to certain variations in the configuration. For example, the control cabinets 13 of the application apparatuses 1 are arranged, for example, in different ways on the base body 10 of the respective application apparatus 1. In addition, the sensor unit 9 for checking a position of a bodywork part in space is absent from the application apparatus 1 according to FIG. 13, since this application apparatus 1 is fixed. However, the two application apparatuses 1 are based on the same functional modules and can be constructed, in particular, from the same modular kit.

Figures 14, 15:
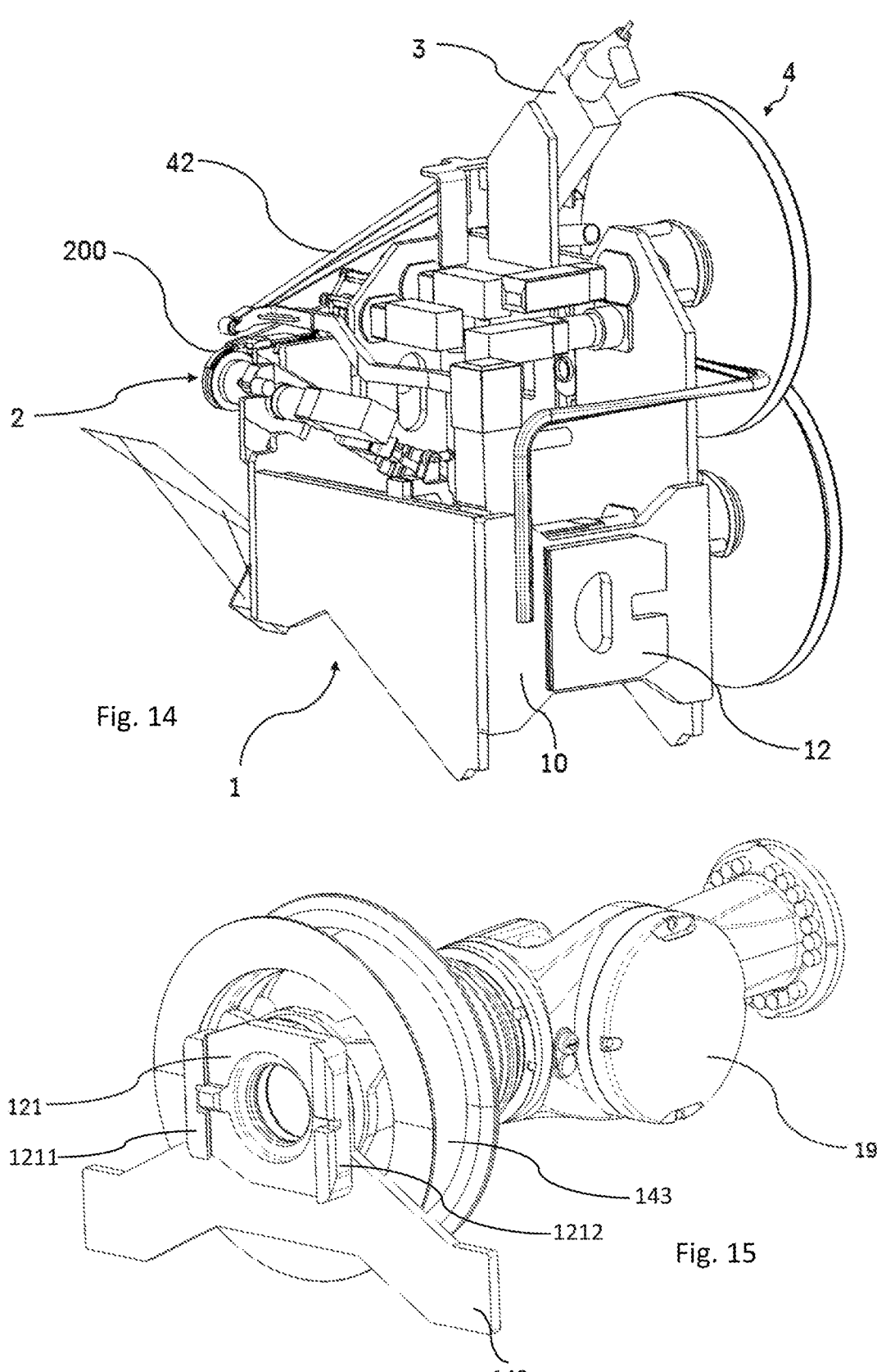
FIG. 14 shows a perspective view of a further embodiment of an application apparatus designed according to the disclosure, showing the base body comprising an arrangement interface.
FIG. 15 shows a perspective view of an embodiment of a robot arm with a counterpart for connecting to the arrangement interface of an application apparatus designed according to the disclosure.
Figure 16:
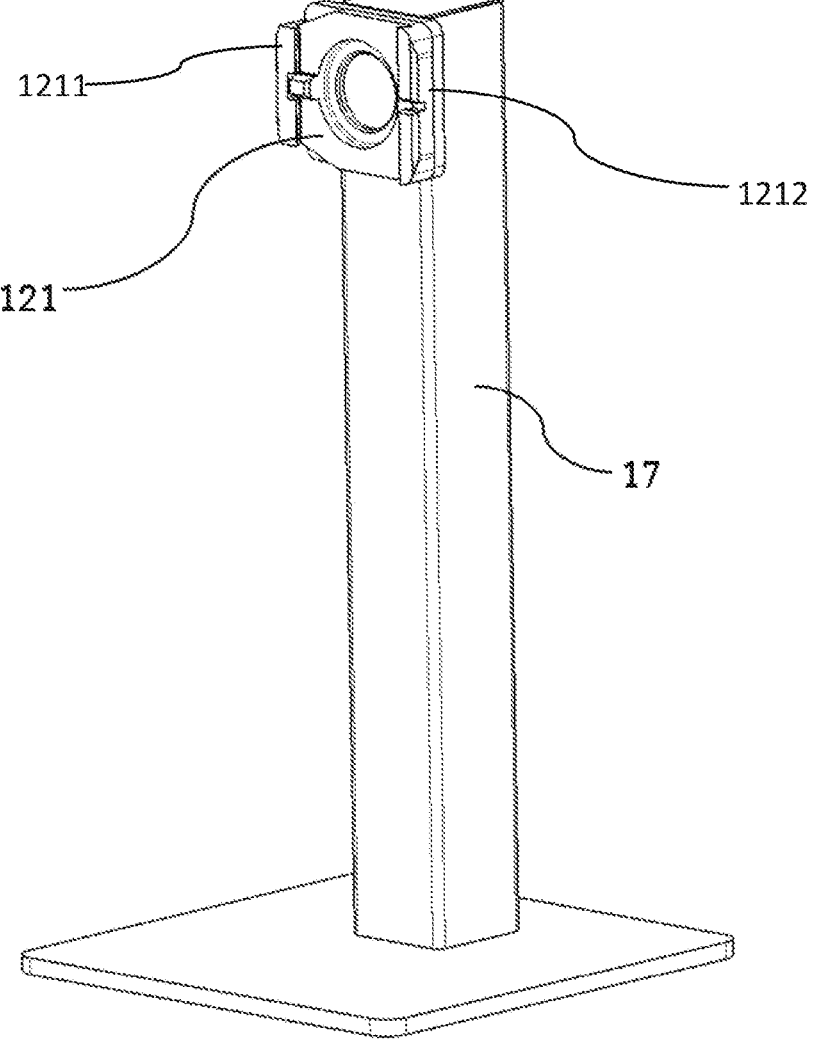
FIG. 16 shows a perspective view of an embodiment of a stationary mounting stand with a counterpart for connecting to the arrangement interface of an application apparatus designed according to the disclosure.

FIG. 14 shows an application apparatus 1 which is intended for applying a sealing profile 200 to a bodywork part and has a base body 10 on which a plurality of functional modules 2, 3, 4 are arranged at predetermined arrangement positions. The base body 10 of the application apparatus 1, in addition, has an arrangement interface 12, which is designed to arrange the base body 10 on a movable robot arm 19, in particular a robot arm 19 as shown in FIG. 15, or on a station support 17, in particular on a station support as in FIG. 16. FIG. 14 shows a particularly advantageous configuration of the arrangement interface 12. The arrangement interface 12 here is set back slightly from the base body 10. The arrangement interface 12 essentially has a rectangular periphery, wherein the edges are bevelled in the direction of one side of the arrangement interface 12, as shown in FIG. 14, in particular for simplified arrangement on a counterpart 121 of the arrangement interface 12. In addition, this side contains a cutout, as is likewise shown in FIG. 14. A counterpart 121 of the arrangement interface 12 is advantageously arranged on the robot arm 19, as shown in FIG. 15. As an alternative to this, a counterpart 121 of the arrangement interface 12 is advantageously arranged on the station support 17, as shown in FIG. 16, wherein the station support 17 provided in FIG. 16 is in the form of a stationary mounting stand. The counterpart 121 is designed to complement the arrangement interface 12, so that the arrangement interface 12 can be connected to the counterpart 121 in a form-fitting manner, a protrusion of the counterpart engaging in the aperture of the arrangement interface 12. In particular, provision is made for the arrangement interface 12 also to be fixed on the counterpart 121 by fastening means, in particular screws. In particular, it is also possible for corresponding drilled holes and/or bolts already to be provided for this purpose on the arrangement interface 12 and/or on the counterpart 121, these drilled holes and/or bolts not being illustrated in FIG. 14 to FIG. 16. As illustrated in FIG. 15 and in FIG. 16, the counterpart 121 of the arrangement interface 12 can have a pair of clamping jaws, which receive the arrangement interface 12 and fix it in place. In this embodiment, the pair of clamping jaws is in the form of an adjustable clamping jaw 1211 and a fixed clamping jaw 1212. When the arrangement interface 12 has been received in the pair of clamping jaws, the adjustable clamping jaw 1211 is moved in the direction of the fixed clamping jaw 1212 via a screw (not illustrated explicitly in the figures) and fixes the arrangement interface 12 in this way.

As shown in FIG. 14, it is then possible—without any changes having to be made to the application apparatus 1 shown in FIG. 14—for the application apparatus 1 to be connected either to the robot arm 19 or the station support 17 via the arrangement interface 12. The application apparatus 1 can advantageously be arranged on a robot arm 19 or on a station support 17 by means of a first set of adapters provided for arranging on a robot arm 19 or by means of a second set of adapters provided for arranging on a station support 17. These adapters, which can involve, for example, the mount 141 of a control cabinet 13 or a mount 142 for the sensor units 9 for checking a position of a bodywork part in space and/or a seal drum 143, in which the sealing profile is supplied, are advantageously arranged in supplementary fashion on the application apparatus 1, so that the application apparatus 1 can be adapted to even better effect to the respective arrangement scenario. However, such adaption is not imperative. Thus, in FIG. 12 and FIG. 13, the respective mount 141 for the control cabinet 13 is merely reconfigured in order to improve handling. It is not imperative for the mount 141 of the control cabinet to have a different configuration.

It is advantageously possible to use the set of adapters as standard, and in an advantageous manner, in the form of a separate subassemblies to make adaptations to the application apparatus 1 for a stationary use or for robot-guided use. The application apparatus 1, in particular the base body 10 of the application apparatus 1, is advantageously already designed so that both the components of the first set of adapters and the components of the second set of adapters can be arranged on it. This means that the application apparatus 1, or the base body 10 of the application apparatus 1, already comprises in particular any necessary drilled holes, cutouts and/or holders for the components of these sets. In particular, provision is made for the first set of adapters to comprise at least one of the following components: stationary mounting stand; control-cabinet attachment; seal drum. Furthermore, provision is made, in particular, for the second set of adapters to comprise at least one of the following components: robot attachment; control-cabinet attachment; seal drum.

The embodiments which are illustrated in the figures and have been explained in combination therewith serve to provide explanation of the disclosure and do not limit the disclosure.

LIST OF REFERENCE SIGNS

1 Application apparatus
2 Roller head
21 Contact-pressure unit
22 Supply unit
23 Roller for guiding the sealing profile 200
24 Drive unit for driving rollers (23)
3 Drilling unit
31 Drill bit of the drilling unit (3)
32 Suction-extraction shroud of the drilling unit (3)
33 Drilling axis
331 Drilling axis with adjusted alignment
4 Cleaning unit
41 Cleaning roller
42 Cleaning belt
43 Roll for supplying clean cleaning belt (42)
44 Roll for taking up used cleaning belt (42)
45 Roll-drive unit
46 Drive for the carriage (47) for lateral displacement travel
47 Carriage
48 Contact-pressure cylinder for the cleaning roller (41)
5 Sensor unit for checking the position of the sealing profile applied to a bodywork part
51 Sensing region of the sensor unit (5)
6 Sensor unit for checking a contact-pressure force
7 Sensor unit for measuring a length of sealing profile
71 Rotary encoder
72 Measuring wheel
8 Sensor unit for measuring a floating position of a contact-pressure unit
81 Contact plate
9 Sensor unit for checking a position of a bodywork part in space
91 Retaining device
10 Base body
101 Aperture
102 Protrusion
103 Drilled hole
11# Arrangement position ("#" denotes the reference sign of a respective module)
1131 Arrangement position for a drilling unit (3) for drilling during application of the sealing profile
1132 Arrangement position for a drilling unit (3) for drilling following application of the sealing profile
114 Arrangement position for a cleaning unit (4)
115 Arrangement position for a sensor unit (5) for checking the position of the sealing profile applied to a bodywork part
116 Arrangement position for a sensor unit (6) for checking a contact-pressure force
117 Arrangement position for a sensor unit (7) for measuring a length of sealing profile
118 Arrangement position for a sensor unit (8) for measuring a floating position of a contact-pressure unit (21)

119 Arrangement position for a sensor unit (9) for checking a position of a bodywork part in space
1115 Arrangement position for a severing unit (15)
12 Arrangement interface
121 Counterpart of the arrangement interface (12)
1211 adjustable clamping jaw
1212 fixed clamping jaw
13 Control cabinet
141 Mount for control cabinet
142 Mount for sensor units 9
143 Seal drum
15 Severing unit
17 Station support
19 Robot arm
200 Sealing profile

What is claimed is:

1. An application apparatus for applying a sealing profile to a bodywork part, comprising:
   a base body including four metallic plates connected to one another at right angles so that the base body has a rectangular outline, wherein each of the four metallic plates has a configuration different than the others;
   a roller head, configured to apply the sealing profile to a receiving surface of the bodywork part, forming a first station step; and
   at least one further functional unit, configured to perform a further station step associated with the sealing profile and/or the application of the sealing profile, wherein the at least one further functional unit is respectively designed as a functional module from a set of functional modules, wherein the base body includes the roller head and a plurality of predetermined arrangement positions, wherein a specific arrangement position from the plurality of predetermined arrangement positions is assigned to a respective functional module from the set of functional modules for arranging on the base body, wherein each functional module of the application apparatus is arranged at the arrangement position assigned to the respective functional module.

2. The application apparatus according to claim 1, wherein the arrangement positions for the functional modules assigned to these arrangement positions are predetermined so as to define a processing sequence for the respective further station step, which can be performed by the respective associated functional module, in relation to the first station step.

3. The application apparatus according to claim 1, further comprising a drilling unit as a further functional unit, wherein the drilling unit is designed to drill holes into the sealing profile.

4. The application apparatus according to claim 3, wherein the drilling unit is assigned to an arrangement position which defines a further station step drilling of the sealing profile prior to application of the sealing profile; or in that the drilling unit is assigned to an arrangement position which defines as further station step drilling of the sealing profile during application of the sealing profile; or in that the drilling unit is assigned to an arrangement position which defines as further station step drilling of the sealing profile following application of the sealing profile.

5. The application apparatus according to claim 1, further comprising a cleaning unit as a further functional unit, wherein the cleaning unit is designed to clean a receiving surface of the bodywork part.

6. The application apparatus according to claim 5, wherein the cleaning unit is assigned to an arrangement position which defines as a further station step cleaning of a receiving surface of the bodywork part prior to application of the sealing profile or wherein the cleaning unit is assigned to an arrangement position which defines as a further station step cleaning of a receiving surface of the bodywork part during application of the sealing profile.

7. The application apparatus according to claim 1, wherein at least one sensor unit as at least one further functional unit, wherein the sensor unit is designed to monitor a station step being performed.

8. The application apparatus according to claim 7, wherein the respective sensor unit is assigned to an arrangement position which defines as a further station step monitoring of a station step being performed while the station step to be monitored is being performed; and/or in that the respective sensor unit is assigned to an arrangement position which defines as a further station step monitoring of a station step having been performed following the station step to be monitored having being performed.

9. The application apparatus according to claim 7, further comprising a sensor unit for checking a position of a bodywork part in space as a sensor unit.

10. The application apparatus according to claim 7, further comprising a sensor unit for checking the position of the sealing profile applied to a bodywork part as a sensor unit.

11. The application apparatus according to claim 7, further comprising a sensor unit for checking a contact-pressure force during application of the sealing profile to a receiving surface of a bodywork part as a sensor unit.

12. The application apparatus according to claim 7, further comprising a sensor unit for measuring an intended length of a sealing profile to be applied to a receiving surface of a bodywork part as a sensor unit.

13. The application apparatus according to claim 7, further comprising a sensor unit for measuring a floating position of a contact-pressure unit of the application apparatus as a sensor unit.

14. The application apparatus according to claim 1, further comprising a severing unit as a further functional unit, wherein the severing unit is designed to sever a sealing profile.

15. The application apparatus according to claim 14, further comprising the severing unit is assigned to an arrangement position which defines as a further station step severing of the sealing profile during application of the sealing profile.

16. The application apparatus according to claim 1, wherein the base body has an arrangement interface which is designed to arrange the base body on a station support or on a movable robot arm.

17. The application apparatus according to claim 1, wherein the base body is arranged on a station support via the arrangement interface; or in that the base body is arranged on a movable robot arm via the arrangement interface.

18. The application apparatus according to claim 1, wherein the base body has cable guides, in particular entry and/or exit openings, for cables for the at least one functional unit.

19. A modular kit for constructing an application apparatus, comprising:
    a plurality of modules with predefined properties, from which different variants of the application apparatus can be constructed, including:
        basic modules, which are always a part of the kit and always incorporated into the constructed application apparatus; and
        supplementary modules, which are always a part of the kit and sometimes incorporated into the constructed application apparatus;
    wherein the basic modules include a base body and a roller head;
    wherein the supplementary modules include a drilling unit, a cleaning unit, at least one sensor unit and a severing unit.

20. The application apparatus according to claim 1, wherein the metallic plates each have apertures and/or protrusions which form the arrangement positions, and wherein the metallic plates are made of aluminum or steel.

\* \* \* \* \*